March 21, 1933.  L. C. NICHOLS  1,902,575
METHOD OF TREATING OBJECTS
Filed Jan. 23, 1930
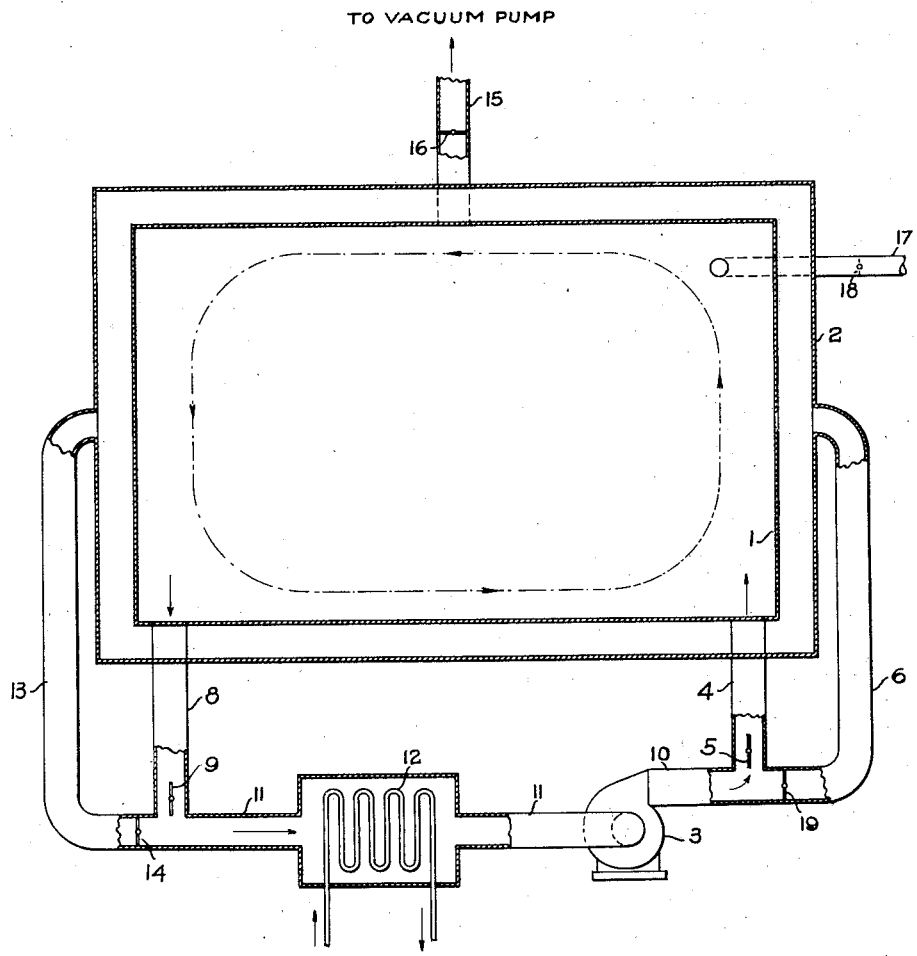

Patented Mar. 21, 1933

1,902,575

UNITED STATES PATENT OFFICE

LOUIS C. NICHOLS, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

METHOD OF TREATING OBJECTS

Application filed January 23, 1930. Serial No. 422,963.

This invention relates to method of treating objects, and in particular of drying, heating or impregnating, or any one or more of these steps. The term objects as relating to objects to be treated is used to designate materials, apparatus, etc., in general anything that it is desired to treat. While the method is particularly adapted for the drying of objects having openings and interstices, and irregular configurations generally, such as, for example, transformers, dynamo-electric, and other electrical machinery, it may be used for treating, for example, asbestos, felt, cotton, lumber, wood products, chemicals, rubber skein yarns, bar soap, etc.

One of the objects of the invention is the provision of a method which will reduce the time required to treat, and, in particular, dry objects. It is accordingly also an object to cause rapid and efficient heating of objects. A further object is the efficient heating of objects while they are being subjected to pressures lower than atmosphere. A still further object is the provision of a method of efficiently impregnating objects. Other objects of the invention will appear hereinafter as the description thereof proceeds.

The novel features of the invention will appear from this specification and the accompanying drawing diagrammatically illustrating the invention and forming a part of the specification, and all these novel features are intended to be pointed out in the claims.

The single figure of the drawing is a diagrammatic representation of one way in which the method can be practiced.

Referring to the drawing, a tank 1 is adapted to receive the objects to be treated. The tank 1 is here shown as of rectangular form but the shape thereof as far as the present invention is concerned is immaterial. The tank 1 is surrounded by a jacket 2 a space being left between the jacket and the tank.

Means for blowing air into the tank 1 is provided this means being here shown as a blower 3 driven in any suitable manner. A conduit 4 shown as passing through the jacket into the tank, may be used to convey air into the tank, and this conduit is preferably disposed to one side of an axis of symmetry of the tank. The flow of air through the conduit 4 may be controlled in any suitable manner as by means of a valve 5. The conduit 4 is connected to the outlet conduit 10 of the blower 3.

Also connected to the outlet conduit 10 of the blower 3 is a conduit 6 adapted to convey air from the blower to the space between the jacket 2 and the tank 1. The flow of air through the conduit 6 may be controlled by a valve 19.

Air may be withdrawn from the tank 1 by a conduit 8 and the passage through this conduit may be controlled by suitable means such as a valve 9. The conduit 8 is connected to the inlet conduit 11 to the blower 3. Assuming the tank 1 to be vertical, the opening of conduit 8 into the tank is preferably at a different level from that of the conduit 4. Thus, if the conduit 4 enters the tank near the top, the conduit 8 preferably enters the tank near the bottom. A heater 12 is here shown as interposed in the conduit 11. The heater 12 may be of any suitable form, such as a steam coil, adapted to heat air flowing in said conduit.

Also connected to the inlet conduit 11 is a pipe 13 adapted to carry air away from the space between the jacket 2 and the tank 1. The flow of air in the conduit 13 may be controlled by a valve 14.

A conduit 15 is connected to the tank 1 and may be in turn connected to a vacuum pump. The passage through the conduit 15 may be controlled by a valve 16.

Another conduit 17 is connected to the tank, here shown as entering its bottom and this conduit may be utilized for introducing impregnating fluid into the tank 1. The passage through conduit 17 may be controlled by a valve 18.

The method of treating objects is preferably as follows. The object to be treated is placed within the tank 1 and the tank is closed in any suitable manner. The valves 14 and 19 are closed and the valves 5 and 9 are open. The valves 16 and 18 are also closed. The blower 3 is started and heating fluid, such for example as steam, is admitted to the heater 12. Air is thus blown into the tank 1 through pipe 4 and swirls as indicated around within the tank proceeding in a more or less helical path to the outlet pipe 8. An object within the tank 1 is of course in this swirling stream of air. The air then passes through pipe 8 through the heater 12 back to the inlet side of the blower where it is again introduced into the tank 1 as hereinbefore mentioned.

When the object within the tank has been heated to the required extent (which may be determined in any suitable manner) as hereinbefore set forth the valves 5 and 9 are closed and the valves 14 and 19 are opened. The circuit for heated air is now from the blower through pipe 6 to the space within the jacket 2 and out of that space through pipe 13 through the heater 12 to the inlet side of the blower. The tank is now being heated from the exterior and the object within the tank 1 is then subjected to a predetermined pressure lower than atmosphere as by connecting the pipe 15 to a vacuum pump. This withdraws air and gases from within the tank 1 and from the object being treated. After the inside of the tank has been subjected for a predetermined time to a pressure below atmosphere, the vacuum or partial vacuum within the tank 1 is preferably broken which may be done in any suitable manner as by opening the pipe 15 to atmosphere thus permitting air to enter tank 1. After the inside of the tank has been subjected to atmospheric pressure for a predetermined time the communication between atmosphere is again closed and connection to the vacuum pump restored thereby again subjecting the inside of the tank to a predetermined pressure lower than atmosphere. This process of making and breaking the vacuum in tank 1 may be continued alternately as required. The number of times the alternate steps are repeated depends upon the desired final condition of the treated object. In case the object is a piece of electrical apparatus, for example, the condition of chief interest is the insulation resistance and this may be measured in any well known manner.

If desired, the object within the tank 1 may be impregnated while the inside of the tank is subjected to a pressure lower than atmosphere by opening the valve 18 and admitting to the tank the desired impregnating fluid. During this process of impregnation the heating of the tank may continue by the circulation of hot air in the space between the tank 1 and the jacket 2 as hereinbefore set forth.

It should be understood that it is not desired to limit the invention to the exact details of construction shown and described, for obvious modifications may occur to persons skilled in the art.

It is claimed and desired to secure by Letters Patent:

1. The process of treating which comprises placing the object to be treated in a container, raising the temperature of said object by blowing heated air into said container, against said object and out of said container for a predetermined time, heating said container from the exterior after stopping said blowing action, and subjecting the inside of said container to a pressure lower than atmosphere by withdrawing the air and vapor from said container while maintaining the heating of said container from the exterior thereof.

2. The process of treating which comprises placing the object to be treated in a container, raising the temperature of said object by causing heated air to flow into said container, to swirl around and against said object and to exit from said container then stopping said blowing after the temperature of said object rises to a predetermined value, reducing the pressure within said container by sealing said container and then withdrawing the air and vapor therein, and maintaining the temperature of said object during said reduction in pressure by heating said container from the exterior.

3. The process of treating which comprises placing the object to be treated in a container, raising the temperature of said object by blowing heated air against said object, maintaining the temperature of said object substantially constant for a predetermined time, then maintaining the temperature of said object substantially constant after stopping said blowing step by heating said container from the exterior, and subjecting the inside of said container alternately to a pressure lower than atmosphere and to atmosphere while heating said container from the exterior.

4. The process of treating which comprises placing the object to be treated in a container, heating said object for a predetermined time by blowing heated air against said object, then withdrawing from the container the vapors emanating from the heated object by subjecting the interior of said container alternately to a pressure below atmosphere and to atmosphere, heating said object by heating said container from the exterior after stopping the step of blowing heated air against said object, and causing an impregnating fluid to flow into said container.

5. The method of treating an object within a closed vessel, which comprises the steps of, heating said object within said vessel by causing heated air to swirl around and against said object whereby vapor is caused to emanate from said object, then subjecting said object to reduced pressure and further heat treatment by stopping said swirling action, sealing said vessel, withdrawing vapor and air from said vessel and heating the exterior of said vessel while withdrawing said vapor and air from said vessel.

6. The method of treating an article within a closed vessel which comprises the steps of, heating said article within said vessel by circulating heated air through said vessel, then subjecting said article to reduced pressure and further heat treatment by sealing said vessel, withdrawing the air from the interior of said vessel, and heating the exterior of said vessel while withdrawing the air from said vessel, and finally impregnating said article by introducing an impregnating liquid into said vessel while said reduced pressure is maintained.

7. The method of treating an object within a closed vessel, which comprises the steps of, heating said object within said vessel by causing heated air to circulate through said vessel at pressure above atmosphere, and subsequently subjecting said object to further heat treatment by heating the exterior of said vessel and subjecting said object alternately to sub-atmospheric and atmospheric pressure by periodically and alternately withdrawing the vapors emanating from said object and opening said closed vessel to the atmosphere while the exterior of said vessel is being heated.

8. The method of treating an object in a closed treating vessel which comprises the steps of, heating said object by first directing a blast of heated air through the interior of said vessel and against said object and then around the exterior of said closed treating vessel, and subjecting the object alternately to sub-atmospheric and atmospheric pressure only while said object is being heated by directing a blast of heated air around the exterior of the closed treating vessel.

In testimony whereof, the signature of the inventor is affixed hereto.

LOUIS C. NICHOLS.